Patented Jan. 20, 1942

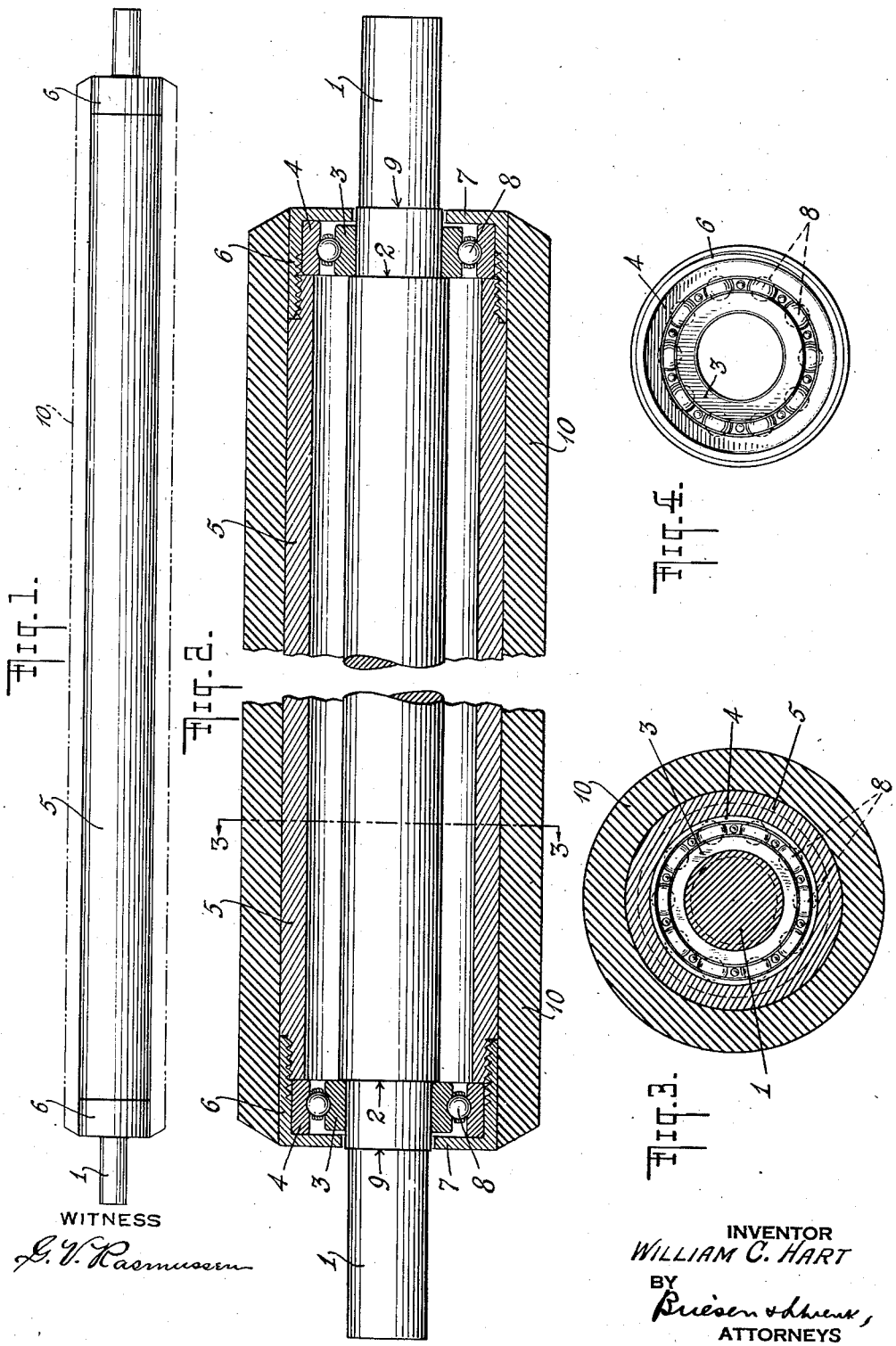

2,270,436

UNITED STATES PATENT OFFICE 2,270,436

PRINTING ROLLER

William C. Hart, Kew Gardens, N. Y.

Application July 31, 1940, Serial No. 348,639

8 Claims. (Cl. 91—67.8)

The invention relates to rollers for printing presses and particularly to rollers for job presses or small sized presses. Heretofore the most satisfactory printing rollers for newspaper presses and the like have been those which embody the structural principles of my Patent No. 1,642,068 of September 13, 1927. When, however, it comes to smaller sized presses where the printing rollers have diameters of say 1½" or 2 to 3½", certain difficulties are encountered which it is the object of the present invention to overcome. The invention is illustrated in the accompanying drawing in which Fig. 1 is an elevation of a roller embodying my invention with the area occupied by the composition that is cast upon the roller indicated in dotted lines. Fig. 2 is an enlarged sectional view of the roller illustrated in Fig. 1 including the cast composition. Fig. 3 is a section on lines 3—3 of Fig. 2 and Fig. 4 is an end view of the ball bearing unit.

In the drawing 1 represents the shaft which is preferably solid and provided with the shoulder 2. Against the shoulder 2 the inner ring 3 of the ball bearing abuts. The outer ring 4 of the ball bearing abuts against the outer edge of the roller core cylinder 5. The internally threaded cap 6 is screwed upon correspondingly threaded outer end portions of the cylinder 5 so that the flange 7 of the cap will hold the outer ring 4 of the ball bearings tight against the outer edge of the cylinder. The balls 8 are interposed between the two bearing rings 3 and 4 and when the outer ring 4 is in tight position with respect to the cylinder 5, the inner ring 3 is in tight position against the shoulder 2 of the shaft 1. The shoulder 2 on the shaft 1 provides an abutment for engagement with the trunnions or supports for the roller in the press. Once the roller core has been assembled as described, the composition 10 is cast upon the core and the roller is ready for use. By virtue of the fact that the ball bearing is located outside of the interior of the cylinder 5, it is possible to use ball bearings of larger diameters than would be possible if it were attempted to place the roller bearings inside of said cylinder, which is a feature of considerable practical importance. The roller core as described is easily lubricated in the region of the bearings and the entire mechanism, although extremely simple, performs its functions perfectly. The socket and journal ends of the press are not exposed to wear because the cylinder 5 rotates with the greatest ease and freedom on the shaft via the ball bearings. If there is any appreciable wear on the sockets and journal ends, no rollers, however true they may be when delivered, can be set properly. Every modern roller manufacturer is equipped with steel molds as near perfection as science can make them, but the pressman readily appreciates that such expensive equipment is worthless if the journal ends are exposed to wear. This difficulty is entirely overcome by the ball-bearing roller core having the facility of movement in the cylinder portion thereof which flows from the use of ball bearings which, in the small cores, have a larger diameter than the inner opening of the cylinder 5.

The roller described can readily be assembled and disassembled. Should any difficulty develop in the ball-bearing unit, all that is necessary is to unscrew the end cap 6, to strip the ball bearing unit from the shaft 1, and to position a new ball bearing in place, and screwing back the cap 6. In the assembled structure the inner ring 3 of the ball bearing has a tight fit on the shaft 1 so as to be substantially stationary during use. The outer ring 4, on the other hand, is tightly fitted against the outer edge of the cylinder 5., being held in tight relation therewith by the flange 7 of the cap 6.

It will be observed that in the structure described there is no possibility of endwise movement as between the cylinder and the shaft, notwithstanding the fact that the flange 7 of the cap 6 does not engage the outer face of the inner ring 3 of the ball bearing. This absence of any possibility of longitudinal movement as between the shaft 1 and the cylinder 5 causes the roller to function with true exactitude.

Since the roller revolves easily without requiring removal from the press, a considerable saving is obtained in the washing up operation which can be done in a very much shorter time, as the rollers can revolve without being removed from the press. There is also a material saving in the roller composition, since more than half of the friction, as well as heating up of the core ends, is eliminated, reducing wear and tear on the composition. There is a material saving in power as the major part of the roller weight is stationary, causing less friction and thereby reducing the consumption of power.

I claim:

1. A ball-bearing roller core provided with a central shaft, a ball bearing unit supported on said shaft having an inner ring abutting against a shoulder on said shaft, a cylinder spaced from the shaft and encircling the same, said ball bearing unit encircling a different portion of said shaft than said cylinder and positioned adjacent to an end of said cylinder with the outer ring of the ball bearing unit tightly pressed against an outer edge surface of said cylinder, a cap engaging an outer portion of said cylinder and having a flange in tight engagement with the outer edge of the outer ring of the bearing unit, the outer surface of the periphery of the cap and of the cylinder forming the exterior surfaces of the roller core and being adapted to receive a cast-on composition.

2. A roller having, in combination, a central shaft provided with a pair of spaced shoulders, a pair of ball bearing units mounted in spaced relation on said shaft with their inner rings abutting said shoulders, a cylinder positioned intermediate said bearing units with its ends abutting the inner edges of the outer rings of the bearing units, said cylinder being spaced from the shaft and encircling the same, a cap attached to each end of said cylinder and having an exterior cylindrically-shaped surface forming a part of the exterior surface of the roller and having an inwardly extending flange in tight engagement with the outer edge of the outer ring of its associated bearing unit, the exterior surfaces of said cylinder and said caps being adapted to receive a cast-on composition.

3. A roller having, in combination, a central shaft, a cylindrically-shaped drum spaced from said shaft and encircling the same, said drum being composed of a centrally disposed elongated body portion and end portions connected to the ends of said body portion, a pair of bearing units mounted in spaced relation on said shaft and contained within the end portions of said drum, means on each of the end portions of said drum securing the bearing units against lengthwise movement in one direction on said shaft and a cast-on composition covering the exterior surfaces of the centrally disposed portion and the end portions of the drum and securing the same together.

4. A roller having, in combination, a central shaft, a closed cylindrically-shaped drum revolvably mounted in spaced relation on said shaft and including a centrally disposed elongated body portion and end portions removably connected to the ends of said body portion, each of said end portions being provided at its outer end with an annular flange extending inwardly towards said shaft and closing the end of the drum, a pair of bearing units mounted in spaced relation on said shaft, the outer ring of each of said bearing units being clamped between a flange of one of said drum end portions and a portion of said body portion, means on said shaft engaged by the inner rings of said bearing units and preventing movement of such rings toward the middle of the shaft and a cast-on composition covering the exterior surfaces of the body portion and the end portions of the drum and securing the same together.

5. A roller such as defined in claim 4 in which said shaft is provided with a pair of spaced abutments situated outside of the confines of said closed drum and adapted for engagement with a support for the roller on a press to limit endwise movement of the shaft in its bearings, said abutments being closely adjacent to planes extending transversely of the shaft and containing the exterior surfaces of the flanges of said end portions of the drum.

6. A roller having, in combination, a central shaft, a cylinder spaced from said shaft and encircling the same, a cap having a cylindrical portion removably connected to an end of said cylinder and a flange portion provided on the outer end of said cap and extending inwardly towards said shaft to points short of engagement with the shaft, the exterior surface of the cylindrical portion of said cap forming a continuation of the exterior surface of said cylinder and said flange closing the end of the roller formed by said cylinder and cap, a bearing unit contained in said cap and positioned intermediate said flange and the adjacent end of said cylinder, the outer ring of said bearing unit being clamped between said flange and the adjacent end of said cylinder and the inner ring of said bearing unit being spaced from said flange and abutting a shoulder provided on said shaft, and a cast-on composition covering the exterior surfaces of said cylinder and the cylindrical portion of said cap and securing the two together.

7. A roller having, in combination, a central shaft, a closed cylindrically-shaped drum revolvably mounted in spaced relation on said shaft and including a centrally disposed cylinder and cap members having cylindrically-shaped body portions and internal flanges forming the end walls of the drum, the body portions of said caps being threadedly connected to the ends of said cylinder and having an inside diameter greater than the inside diameter of said cylinder and having an outside diameter similar to the outside diameter of the cylinder, the exterior surfaces of the body portions of said caps and the exterior surface of said cylinder together forming the exterior surface of said drum, a bearing unit contained in each of said caps, the outer ring of each bearing unit having an exterior diameter greater than the interior diameter of said cylinder and being clamped intermediate an adjacent end of said cylinder and the flange of its associated cap, and the inner ring of each unit being mounted on said shaft in spaced relation with the flange of its associated cap and in abutting relation with a stop member provided on said shaft, and a cast-on composition covering the exterior cylindrical surfaces of the caps and cylinder and securing such members together.

8. A roller having, in combination, a central shaft, a closed cylindrically-shaped drum revolvably mounted on said shaft and including an elongated centrally disposed cylindrical body portion, cylindrically-shaped end members connected to the ends of said cylindrical body portion and closure members closing the ends of the drum, the exterior surfaces of said end members and of said cylindrical body portion together forming the exterior surface of the drum and the inside diameters of said end members being greater than the inside diameter of said cylindrical body portion, bearing units mounted in spaced relation on said shaft so as to be surrounded by each of said end members and positioned intermediate the ends of said cylindrical body portion and said closure members, the outer ring of each bearing unit having an exterior diameter greater than the interior diameter of said cylindrical body portion, and a cast-on composition covering the exterior cylindrical surfaces of said cylindrical body portion and said end members.

WILLIAM C. HART.